April 24, 1951　　　R. D. LEE　　　2,549,911
PIPE LAYOUT MACHINE
Filed Nov. 4, 1949　　　　　　　　　　2 Sheets-Sheet 1
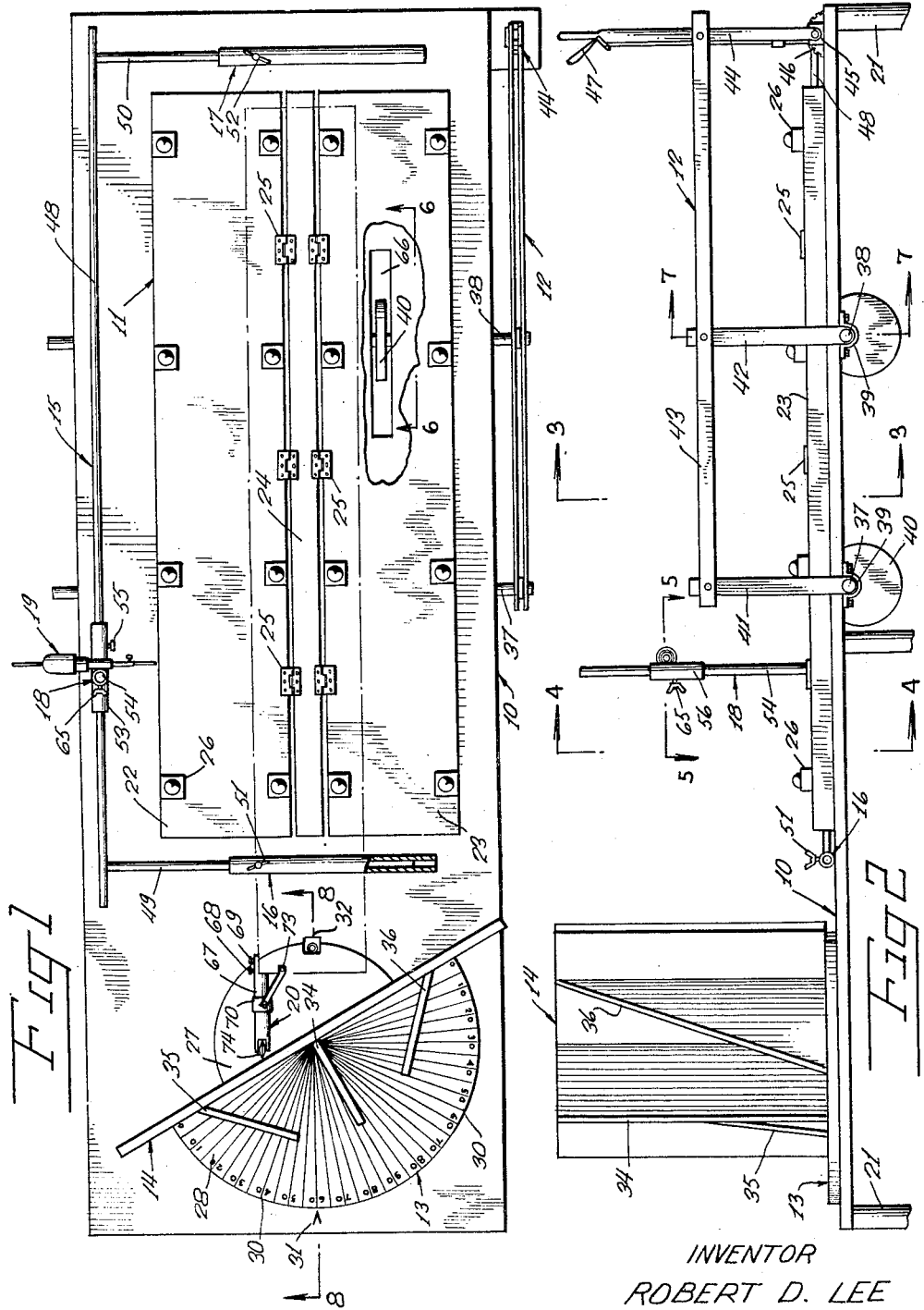
INVENTOR
ROBERT D. LEE
BY
McMorrow, Berman + Davidson
ATTORNEYS April 24, 1951 — R. D. LEE — 2,549,911
PIPE LAYOUT MACHINE
Filed Nov. 4, 1949 — 2 Sheets-Sheet 2
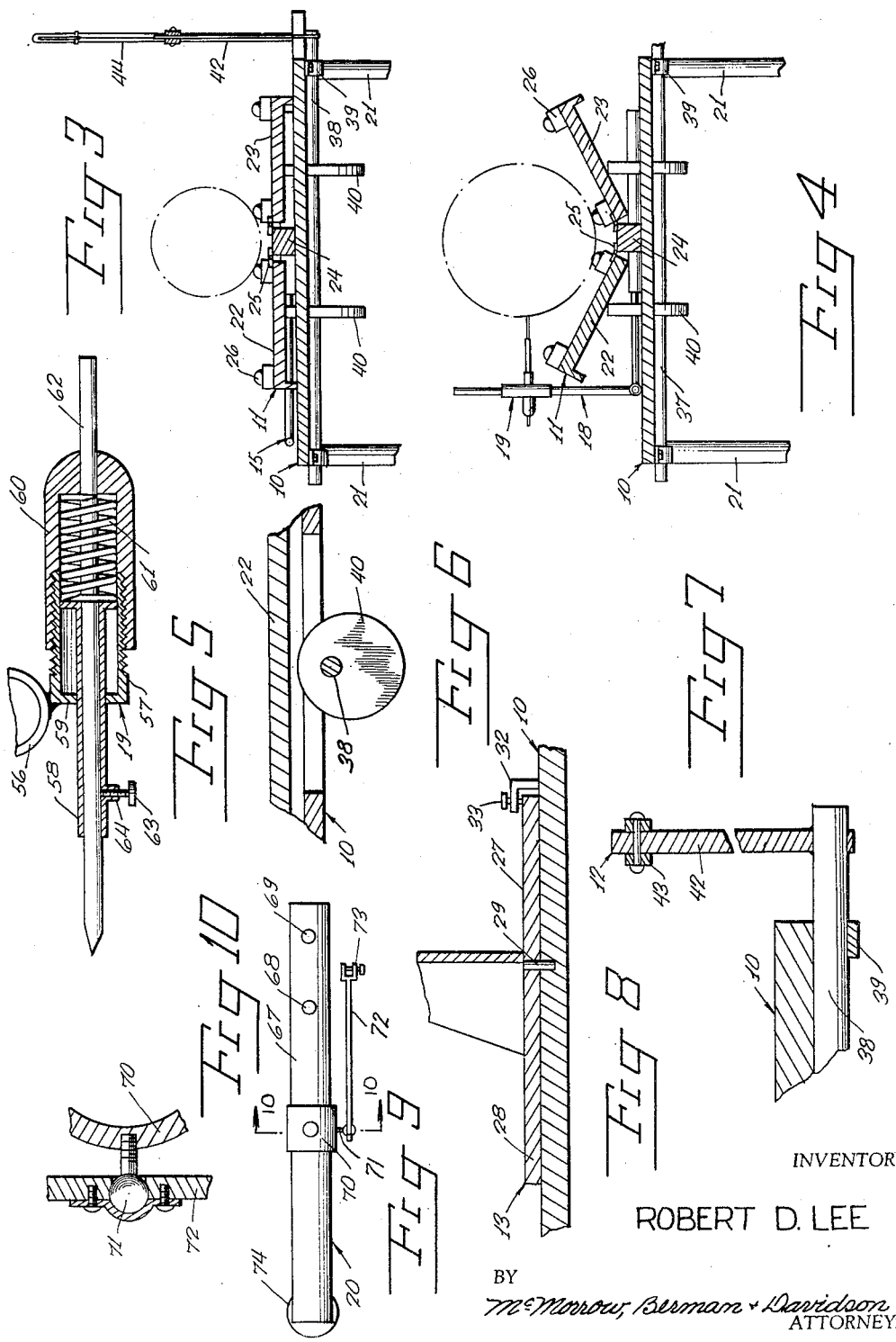
INVENTOR
ROBERT D. LEE Patented Apr. 24, 1951

2,549,911

UNITED STATES PATENT OFFICE 2,549,911

PIPE LAYOUT MACHINE

Robert D. Lee, South Gate, Calif.

Application November 4, 1949, Serial No. 125,461

3 Claims. (Cl. 33—21)

This invention relates to pipe layout machines, and more particularly to apparatus for establishing on pipes or tubes severance lines disposed in predetermined angular relationship to the longitudinal center lines of such pipes or tubes.

It is among the objects of the invention to provide improved pipe layout apparatus for marking or cutting end cuts of various selected angles on pipes or tubes of different sizes, so that a pipe can be cut to fit another pipe or a wall and extend at a predetermined angle therefrom, which apparatus provides the desired mark or cut directly on the pipe and in a short time with a minimum amount of manual labor and without mathematical computation, and which is simple and durable in construction, economical to manufacture, and easy to use.

Other objects and advantages will become apparent from a consideration of the following description and the appended claims in conjunction with the accompanying drawings, wherein:

Figure 1 is a top plan view of a pipe layout machine illustrative of the invention;

Figure 2 is a side elevation of the machine illustrated in Figure 1;

Figure 3 is a transverse cross-section on the line 3—3 of Figure 2;

Figure 4 is a transverse cross-section on the line 4—4 of Figure 2, with the parts in a somewhat different operative position from that illustrated in Figure 3;

Figure 5 is a cross-section on an enlarged scale on the line 5—5 of Figure 2;

Figure 6 is a cross-section of a fragmentary portion of the machine taken on the line 6—6 of Figure 1;

Figure 7 is a cross-section on the line 7—7 of Figure 2 of a fragmentary portion of the machine;

Figure 8 is a cross-section on the line 8—8 of Figure 1 of a fragmentary portion of the machine;

Figure 9 is a top plan view of a feeler arm constituting an operative component of the machine; and Figure 10 is a cross-section on an enlarged scale on the line 10—10 of Figure 9.

With continued reference to the drawings, the pipe layout machine comprises, in general, an elongated, rectangular table 10, a pipe bed 11 supported on the table and extending longitudinally thereof, manually-operated means 12 carried by the table and engaging the pipe bed for adjusting the pipe bed to pipes of different sizes, a protractor plate 13 pivotally mounted on the table at a location spaced from one end of the pipe bed 11, a gauge plate 14 secured at one edge to the protractor plate 13 along the straight, diametrical edge of the protractor plate and upstanding from the protractor plate substantially perpendicular thereto, a standard support 15 extending longitudinally of the pipe bed at a location spaced from one side of the latter, means 16 and 17 supported on the table at the respectively-opposite ends of the pipe bed for slidably mounting the standard support on the table for movements of adjustment toward and away from the pipe bed, a vertical standard 18 supported at its lower end on the standard support 15 for movements of adjustment longitudinally of the standard support, and a device 19 carried by the standard 18 and adjustably movable longitudinally of the latter for locating a severance line on a pipe supported on the pipe bed 11, and a feeler arm 20 attachable to such a pipe at the end of the pipe adjacent the gauge plate 14 for contacting the gauge plate as the pipe is rotated on the pipe bed to thereby move the pipe longitudinally as it is rotated and establish a severance line having an angular relationship to the longitudinal center line of the pipe corresponding to the angular setting of the protractor plate 13 and gauge plate 14.

The table 10 may conveniently comprise an elongated, rectangular piece of metal of suitable thickness supported at its four corners on legs 21 and, if desired, reinforced by suitable frame members attached to or positioned adjacent its under surface.

The pipe bed comprises three elongated, rectangular metal plates 22, 23 and 24 mounted on the table 10 and extending longitudinally thereof. The three plates 22, 23 and 24 are all of substantially the same length, which is materially shorter than the length of the table, the two outside plates 22 and 23 have a width less than one-half the width of the table, and the center plate 24 has a width materially less than the width of the two outside plates 22 and 23. The center plate 24 is firmly and permanently secured to the table and the two outside plates 22 and 23 are disposed along the respectively-opposite, longitudinal edges of the center plate and secured to the center plate by spaced-apart hinges 25. The two outside plates carry ball-and-socket assemblies 26 thereon at spaced-apart intervals along each longitudinal edge of both plates. These ball-and-socket assemblies provide anti-friction bearings for pipes or tubes supported on the pipe bed, so that the pipes can be easily rotated and moved longitudinally on the bed without material frictional resistance.

The pipe bed is disposed adjacent one end of the table, but spaced a considerable distance from the opposite end of the table and a well is provided in the upper side of the table located on the longitudinal center line of the table substantially midway between such opposite end of the table and the adjacent end of the pipe bed 11 to receive a pivot pin for pivotally mounting the protractor plate and gauge plate assembly on the table.

The protractor plate comprises a flat plate comprising two semi-circular parts 27 and 28 of different radii, but centered on a common center and joined along a common diametrical line which extends radially outward at both sides of the smaller part 27. An aperture is provided in the plate 13 concentric with the common center of curvature of the two semi-circular parts 27 and 28, and a pin 29 is received in this aperture and seated in the well or recess provided in the table 10 to pivotally mount the protractor plate on the table. The protractor plate is provided on its upper surface with degree marks 30 and a pointer 31 is provided on the table adjacent the semi-circular edge of the larger portion of the protractor plate for cooperation with the degree marks 30 to indicate the angular position of the diametrical edge of the larger plate portion 28 relative to the longitudinal center line of the table.

It may here be noted that the center plate 24 of the pipe bed is mounted on the table so that its center line is substantially coincident with the longitudinal center line of the table, whereby the longitudinal center line or axis of a pipe supported on the pipe bed, when extended, will intersect the extended axis of the pivot pin 29 of the protractor plate.

An angle bracket 32 is secured to the table 10 at a location along the longitudinal center line of the table closely adjacent the semi-circular edge of the smaller part 27 of the protractor plate, and this bracket has a leg overlying the marginal portion of the part 27 of the protractor plate and provided with a screw-threaded aperture. A thumb screw 33 is threaded through the aperture in the bracket 32 and engages the upper surface of the smaller part of the protractor plate to releasably lock the protractor plate in any desired position of angular adjustment relative to the longitudinal center line of the table, it being noted that the indicator 31 is located on the longitudinal center line of the table 10.

The gauge plate 14 is a flat plate, which may be of square or rectangular shape, and is secured along one edge to the protractor plate 13 along the common diameter of the small and large parts of the protractor plate. This gauge plate extends perpendicularly upward from the protractor plate and is rigidly secured in this position by a center gusset 34 and two side gussets 35 and 36 disposed in the angle between the gauge plate and the larger part of the protractor plate and welded, or otherwise suitably secured to both plates.

The center gusset 34 is of generally rectangular shape and is disposed substantially perpendicular to both the gauge plate and the protractor plate along the vertical center line of the gauge plate and the medial radius of the larger portion of the protractor plate. The two side gussets 35 and 36 are disposed at respectively-opposite sides of the center gusset 34 and are of generally triangular shape. These two side gussets are disposed substantially perpendicular to the protractor plate, but are inclined in a direction away from the gauge plate and toward the outer edge of the center gusset 34, as in clearly illustrated in Figure 1.

With this construction, the gauge plate 14 is supported perpendicular to the top of the table 10 and may be releasably secured in any desired position of angular adjustment relative to the longitudinal center line of the table.

The means for adjusting the pipe bed to pipes of different sizes comprises two cam shafts 37 and 38 which extend transversely below the table 10 in spaced-apart, substantially-parallel relationship to each other and are journaled in bearing blocks 39 secured to the under side of the table. Two circular cams 40 are eccentrically mounted on each shaft 37 and 38 in position such that one cam on each shaft underlies the plate 22 of the pipe bed and the other cam on each shaft underlies the plate 23 of the pipe bed, so that, when the shafts 37 and 38 are simultaneously rotated, both of the outside plates 22 and 23 of the pipe bed will be tilted upwardly about their hinge connections with the center plate 24 from a flat position, as illustrated in Figure 3, to an inclined or trough-shaped position, as illustrated in Figure 4.

An arm 41 is secured at one end to the shaft 37 at one end of the latter and extends upwardly therefrom, and a similar arm 42 is secured at one end to the shaft 38 at one end of the latter and extends upwardly therefrom, these arms being spaced from the adjacent side of the table, as is clearly illustrated in Figure 1. An elongated bar 43 is pivotally connected to the arms 41 and 42 near the upper ends of the latter, and extends substantially to the end of the table opposite the protractor plate and gauge plate assembly. A hand lever 44 is pivotally connected at its lower end to a bracket 45 mounted on the top of the table and is pivotally connected intermediate its length to the bar 43. A toothed quadrant 46 is secured on the table at the lower end of the hand lever and a detent carried by the lever and operated by a handle 47 is engageable with the quadrant to releasably lock the hand lever in various positions of adjustment. By this means, the pipe bed can be adjusted to properly support pipes or tubes of different diameters, so that the longitudinal center line of such a pipe will be substantially in vertical alignment with the longitudinal center line of the table.

The means 16 and 17 for supporting the standard support 15 comprise two sections of metal tubing secured to the upper surface of the table to extend transversely of the table substantially symmetrical with the longitudinal center line of the table and adjacent the respectively-opposite ends of the pipe bed 11.

The support 15 comprises an elongated metal bar 48 horizontally disposed above the table at a location spaced from the adjacent side of the pipe bed 11 and two bars 49 and 50 extending perpendicularly from the bar 48 near respectively-opposite ends of the latter and slidably received in the tubular brackets 16 and 17. The bars 49 and 50 are releasably secured at positions of adjustment longitudinally of the tubular brackets 16 and 17 by suitable means, such as the set screws 51 and 52 threaded respectively through the brackets 16 and 17 and bearing against the bars 49 and 50.

The standard 18 comprises a carriage 53 surrounding and slidably mounted on the elongated bar 48 and a post 54 secured at its lower end to the carriage 53 and upstanding perpendicularly therefrom. A set screw 55 is threaded through the carriage to engage the bar 48 and releasably secure the carriage at various positions of adjustment longitudinally of the bar.

In the arrangement illustrated, the device 19 comprises a carriage 56 slidably mounted on the post 54, an externally-screw-threaded sleeve 57 secured to this carriage to extend perpendicularly therefrom, a tubular carrier 58 slidably mounted in the sleeve 57 and extending through an aperture provided in the end wall 59 of the sleeve, a cap 60 threaded onto the sleeve 57 and overlying the open end of the sleeve, and a compression spring 61 disposed within the cap and interposed between the tubular carrier 58 and the closed end of the cap to resiliently project the carrier from the sleeve. A chalk pencil 62 extends through the carrier 58 and through an aperture in the closed end of the cap 60 and is secured to the carrier by a set screw 63 threaded through a screw-threaded boss 64 provided on the carrier and bearing at its inner end against the pencil 62.

With the above arrangement, after the pipe bed has been adjusted to suitably support the pipe, the set screws 51 and 52 are loosened and the support 48 moved until it is properly positioned relative to the side of a pipe supported on the pipe bed. Screws 51 and 52 are then tightened, the screw 55 is loosened, and the carriage 53 moved along the bar 48 to bring the device 19 to the desired position longitudinally of the pipe, whereupon the screw 55 is tightened and the screw 65 which locks the carriage 56 to the post 54 is loosened and the device 19 adjusted up or down until the point of the pencil 62 is brought into contact with the side of the pipe at a point thereon substantially in a horizontal plane including the longitudinal center line of the pipe. Under these conditions, when the pipe is rotated, the scribe or pencil 62 will mark a line on the outer surface of the pipe.

While a marking device has been illustrated for the purpose of disclosing the invention, it is to be understood that this device may be a pencil or chalk holder, a scribe, a cutting tool, a power-driven milling cutter, or a cutting torch, so that the pipe may either be marked for later severing along a line marked or scribed thereon, or may be severed immediately along the prescribed line.

It is to be noted that the table is provided with elongated slots 66 which respectively receive the cams 40 so that these cams can project from the under side of the table through the corresponding slots to engage the under sides of the side plates 22 and 23 of the pipe bed.

The feeler arm 20 comprises an elongated metal bar 67 bifurcated at one end to provide two furcations spaced apart a distance sufficient to receive a pipe wall therebetween. One of these furcations is apertured and two set screws 68 and 69 are threaded through these apertures at relatively spaced-apart locations to engage the outer surface of the pipe wall and firmly secure the bar 67 to the pipe. A collar 70 surrounds the bar intermediate its length and a ball pin 71 is secured to and projects outwardly from this collar. A brace 72 is secured at one end to the ball of the ball pin and is provided at its opposite end with a clip 73 for engaging the end of the pipe at a location spaced from the bifurcated end of the bar 67 to firmly support the bar on the pipe. A roller 74 is mounted in the bar 67 at its opposite end and is engageable with the adjacent surface of the gauge plate 14.

In using the machine, the protractor plate 13 is set at the desired angle and, after the device 19 is suitably adjusted, as described above, the pipe carried on the pipe bed 11 is rotated with the roller 74 in contact with the gauge plate 14. The angular position of the gauge plate will impart longitudinal movement to the pipe as the pipe is rotated, causing the device 19 to locate on the pipe a line of severance having an angular relationship to the longitudinal center line of the pipe corresponding to the angular relationship of the protractor plate 13 to the longitudinal center line of the table.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What I claim is:

1. Pipe lay-out apparatus comprising an elongated table, an adjustable pipe bed mounted on said table and extending longitudinally thereof, manually-operated means carried by said table and engaging said pipe bed for adjusting the latter to different size pipe, a protractor plate pivotally secured to said table at one end of said pipe bed, a gauge plate secured at one edge to said protractor plate along a diameter of the latter and upstanding substantially perpendicularly therefrom, a standard support extending longitudinally of said pipe bed at one side thereof and slidably connected to said table for movement toward and away from said pipe bed, a vertical standard mounted at its lower end on said standard support for movements of adjustment longitudinally of said support, means carried by said standard and adjustably movable longitudinally thereof for locating a line of severance on a pipe supported on said pipe bed, and means attachable to a pipe supported on said pipe bed at the end of such pipe adjacent said gauge plate to contact said gauge plate and move the pipe longitudinally as the same is rotated on said pipe bed for establishing on the pipe a line of severance having an angular relationship to the longitudinal center line of the pipe corresponding to the angular setting of said protractor plate and gauge plate.

2. Pipe lay-out apparatus comprising an elongated table, an adjustable pipe bed mounted on said table and extending longitudinally thereof, manually-operated means carried by said table and engaging said pipe bed for adjusting the latter to different size pipe, a protractor plate pivotally secured to said table at one end of said pipe bed, a gauge plate secured at one edge to said protractor plate along a diameter of the latter and upstanding substantially perpendicularly therefrom, a standard support extending longitudinally of said pipe bed at one side thereof and slidably connected to said table for movement toward and away from said pipe bed, a vertical standard mounted at its lower end on said standard support for movements of adjustment longitudinally of said support, means carried by said standard and adjustably movable longitudinally thereof for locating a line of severance on a pipe supported on said pipe bed, and means attachable to a pipe supported on said pipe bed at the end of such pipe adjacent said gauge plate to contact said gauge plate and move the pipe longitudinally as the same is rotated on said pipe bed for establishing on the pipe a line of severance having an angular relationship to the longitudinal center line of the pipe corresponding to the angular setting of said protractor plate and gauge plate, said pipe bed comprising a center plate extending longitudinally of said table substantially symmetrical with the longitudinal center line of the latter, two side plates disposed along respectively opposite sides of said center plate and hinged thereto, and ball-and-socket assemblies on said side plates providing antifriction bearings for a pipe supported on said pipe bed.

3. Pipe lay-out apparatus comprising an elongated table, an adjustable pipe bed mounted on said table and extending longitudinally thereof, manually-operated means carried by said table and engaging said pipe bed for adjusting the latter to different-size pipe, a protractor plate pivotally secured to said table at one end of said pipe bed, a gauge plate secured at one edge to said protractor plate along a diameter of the latter and upstanding substantially perpendicularly therefrom, a standard support extending longitudinally of said pipe bed at one side thereof and slidably connected to said table for movement toward and away from said pipe bed, a vertical standard mounted at its lower end on said standard support for movements of adjustment longitudinally of said support, means carried by said standard and adjustably movable longitudinally thereof for locating a line of severance on a pipe supported on said pipe bed, and means attachable to a pipe supported on said pipe bed at the end of such pipe adjacent said gauge plate to contact said gauge plate and move the pipe longitudinally as the same is rotated on said pipe bed for establishing on the pipe a line of severance having an angular relationship to the longitudinal center line of the pipe corresponding to the angular setting of said protractor plate and gauge plate, said pipe bed comprising a center plate extending longitudinally of said table substantially symmetrical with the longitudinal center line of the latter, and two side plates disposed along respectively opposite sides of said center plate and hinged thereto, and said manually-operated means comprising two cam shafts journaled on said table and extending transversely thereof, eccentric cams on said cam shafts contacting said side plates to tilt the latter about their hinge connections with said center plate, two arms each secured at one end to a respective cam shaft, a bar pivotally connected to the opposite ends of said arms, a hand lever pivotally connected at one end to said table and pivotally connected intermediate its length to said bar, and means carried by said table and said hand lever for releasably locking said lever in adjusted position relative to said table.

ROBERT D. LEE.

REFERENCES CITED

The following references are of record in the file of this patent:

UNITED STATES PATENTS

| Number | Name | Date |
| --- | --- | --- |
| 1,858,076 | Douglass | May 10, 1932 |
| 2,429,559 | Matson | Oct. 21, 1947 |